(12) United States Patent
Medina Acosta et al.

(10) Patent No.: US 12,213,100 B2
(45) Date of Patent: Jan. 28, 2025

(54) METHODS AND APPARATUSES FOR DETERMINING PAGING OCCASIONS ASSOCIATED WITH NARROWBAND REFERENCE SIGNAL (NRS)

(71) Applicant: Telefonaktiebolaget LM Ericsson (publ), Stockholm (SE)

(72) Inventors: Gerardo Agni Medina Acosta, Märsta (SE); Yutao Sui, Solna (SE); Ritesh Shreevastav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 368 days.

(21) Appl. No.: 17/630,637

(22) PCT Filed: Aug. 14, 2020

(86) PCT No.: PCT/SE2020/050790
§ 371 (c)(1),
(2) Date: Jan. 27, 2022

(87) PCT Pub. No.: WO2021/029820
PCT Pub. Date: Feb. 18, 2021

(65) Prior Publication Data
US 2022/0264519 A1    Aug. 18, 2022

Related U.S. Application Data

(60) Provisional application No. 62/887,583, filed on Aug. 15, 2019.

(51) Int. Cl.
*H04L 5/00* (2006.01)
*H04W 24/08* (2009.01)
*H04W 68/00* (2009.01)

(52) U.S. Cl.
CPC ......... *H04W 68/005* (2013.01); *H04L 5/0051* (2013.01); *H04W 24/08* (2013.01)

(58) Field of Classification Search
CPC ... H04W 68/005; H04W 24/08; H04W 68/00; H04W 88/08; H04W 88/02; H04L 5/0051
See application file for complete search history.

(56) References Cited

U.S. PATENT DOCUMENTS

2018/0220463 A1*  8/2018  Fodor ................... H04L 5/14
2019/0313268 A1* 10/2019  Ananda ............... H04W 68/00
(Continued)

FOREIGN PATENT DOCUMENTS

| CN | 109792743 A  | 5/2019 |
| IN | 201947011454 A | 5/2019 |
| WO | 2018085627 A1 | 5/2018 |

OTHER PUBLICATIONS

3rd Generation Partnership Project, "Technical Specification Group Radio Access Network;Evolved Universal Terrestrial Radio Access (E-UTRA);User Equipment (UE) procedures in idle mode(Release 15)", Technical Specification, 3GPP TS 36.304 V15.4.0, Jun. 1, 2019, pp. 1-54, 3GPP, France.

(Continued)

*Primary Examiner* — Chi Ho A Lee
*Assistant Examiner* — Andrew Lee
(74) *Attorney, Agent, or Firm* — COATS & BENNETT, PLLC

(57) ABSTRACT

A User Equipment, UE (700), determines paging occasions that are associated with a Narrowband Reference Signal, NRS, from a plurality of paging occasions based on a common timing reference between a Radio Access Network, RAN, node (600) and the UE (700). The RAN node (600) transmits, to the UE (700) the NRS on paging occasions based on the common timing reference.

19 Claims, 19 Drawing Sheets

(56) References Cited

U.S. PATENT DOCUMENTS

| | | | |
|---|---|---|---|
| 2020/0053695 A1* | 2/2020 | Charbit | H04W 84/022 |
| 2020/0252903 A1* | 8/2020 | Rico Alvarino | H04W 48/12 |
| 2020/0404617 A1* | 12/2020 | Murray | H04W 68/02 |
| 2021/0219329 A1* | 7/2021 | Zhou | H04L 1/189 |
| 2021/0329591 A1* | 10/2021 | Hwang | H04L 5/0082 |
| 2021/0385034 A1* | 12/2021 | Hwang | G16Y 10/75 |
| 2021/0385788 A1* | 12/2021 | Su | H04W 68/02 |
| 2022/0104001 A1* | 3/2022 | Ou | H04W 8/08 |
| 2022/0124711 A1* | 4/2022 | Zhou | H04W 16/14 |

OTHER PUBLICATIONS

Ericsson, "Presence of NRS on a non-anchor carrier for paging in NB-Iot", 3GPP TSG-RAN WG1 Meeting #97, Reno, Nevada, USA, May 13, 2019, pp. 1-12, R1-1905970, 3GPP.

Mediatek Inc., "NRS presence on non-anchor carrier in NB-Iot", 3GPP TSG RAN WG1 Meeting #96, Athens, Greece, Feb. 25, 2019, pp. 1-5, R1-1901735, 3GPP.

Huawei et al., "NRS presence on non-anchor carriers for paging", 3GPP TSG RAN WG1 Meeting #97, Reno, USA, May 13, 2019, pp. 1-6, R1-1905976, 3GPP.

3rd Generation Partnership Project, "3rd Generation Partnership Project; Technical Specification Group Radio Access Network;Evolved Universal Terrestrial Radio Access (E-UTRA); User Equipment (UE) procedures in idle mode(Release 15)", Technical Specification, 3GPP TS 36.304 V15.2.0, Dec. 1, 2018, pp. 1-52, 3GPP.

Huawei, "WID revision Additional Enhancements for NB-Io-T", 3GPP TSG RAN meeting #83, Shenzhen, China, Mar. 18, 2019, pp. 1-4, RP-190757, 3GPP.

Ericsson, "Presence of NRS on a non-anchor carrier for paging in NB-Iot", TSG-RAN WG1 Meeting #96bis, Xi'an, People's Republic of China, Apr. 8-12, 2019, pp. 1-10, R1-1903896, 3GPP.

\* cited by examiner

|  | PO Subframe | | | |
|---|---|---|---|---|
|  | i_s=0 | i_s=1 | i_s=2 | i_s=3 |
| Ns=1 | 9 | N/A | N/A | N/A |
| Ns=2 | 4 | 9 | N/A | N/A |
| Ns=4 | 0 | 4 | 5 | 9 |

METHODS AND APPARATUSES FOR DETERMINING PAGING OCCASIONS ASSOCIATED WITH NARROWBAND REFERENCE SIGNAL (NRS)

RELATED APPLICATIONS

This application claims priority to U.S. Application No. 62/887,583, filed 15 Aug. 2019, disclosure of which is incorporated in its entirety by reference herein.

TECHNICAL FIELD

The present application generally relates to wireless communication networks, and more particularly relates to monitoring for a Narrowband Reference Signal (NRS).

BACKGROUND

Paging on a non-anchor carrier was introduced in Release 14 (Rel-14) of the Third Generation Partnership Project (3GPP) Narrowband Internet of Things (NB-IoT) standard. In NB-IoT, an anchor carrier traditionally is a carrier that contains the broadcast system information and synchronization signals (i.e., the Narrowband Primary Synchronization Signal (NPSS) and Narrowband Secondary Synchronization Signal (NSSS)). In contrast, a non-anchor carrier does not traditionally contain synchronization signals in NB-IoT.

SUMMARY

Embodiments of the present disclosure are directed to NRS transmission and/or monitoring schemes that facilitate efficiency and/or flexibility of NB-IoT operation. More particularly, one or more embodiments may enable a User Equipment (UE) to more efficiently monitor the Narrowband Physical Downlink Control Channel (NPDCCH) search space of a given paging occasion (PO) by providing a mechanism by which the UE would be able to determine whether or not there will be an upcoming paging message for that UE.

Particular embodiments include a method implemented by a UE. The method comprises determining paging occasions that are associated with an NRS from a plurality of paging occasions based on a common timing reference between a RAN node and the UE.

In some embodiments, the method further comprises monitoring consecutive subframes for the NRS based on a first value indicating how many of the consecutive subframes that precede the paging occasions associated with the NRS to monitor. In some such embodiments, the method further comprises selectively monitoring for the NRS in sets of consecutive subframes, each set of consecutive subframes corresponding to a respective paging occasion. In some such embodiments, the method further comprises receiving a changed first value for each set of consecutive subframes to identify the consecutive subframes in the set.

In some embodiments, the method additionally or alternatively comprises determining the paging occasions associated with the NRS from the plurality of paging occasions is further based on a pattern that indicates which of the plurality of paging occasions are associated with the NRS. In some such embodiments, determining the paging occasions associated with the NRS from the plurality of paging occasions based on the pattern is responsive to receiving a System Information Block indicating that the paging occasions associated with the NRS are not sparse compared to a threshold. In some embodiments, for each of the sets of consecutive subframes, the first value is an integer between one and four.

In other embodiments, the method further comprises receiving a System Information Block indicating that the paging occasions associated with the NRS are sparse compared to a threshold, and in response, determining the paging occasions as being associated with transmissions of the NRS. In some such embodiments, for each of the sets of consecutive subframes, the number of consecutive subframes is ten.

In some embodiments, the method further comprises receiving the first value from the RAN Node.

In some embodiments, the method further comprises determining the common timing reference based on a System Frame Number.

In some embodiments, the method further comprises determining the common timing reference based on a number of radio frames identifying a discontinuous reception cycle length of the UE.

Other embodiments include a method implemented by a RAN node. The method comprises transmitting, to a UE, an NRS on paging occasions based on a common timing reference between the RAN node and the UE.

In some embodiments, the method further comprises transmitting, to the UE, a first value indicating how many consecutive subframes preceding the paging occasions to monitor for the NRS. In some such embodiments, the method further comprises transmitting the NRS in sets of consecutive subframes, each set of consecutive subframes corresponding to a respective paging occasion. In some embodiments, the method further comprises transmitting a changed first value for each set of consecutive subframes for the UE to use in identifying the consecutive subframes in the set in which to monitor for the NRS.

In some embodiments, transmitting the NRS in sets of consecutive subframes comprises transmitting the NRS in accordance with a pattern identifying the paging occasions from a plurality of paging occasions as being associated with the NRS. In some such embodiments, the method further comprises transmitting a System Information Block indicating that the paging occasions are not sparse in time compared to a threshold, and transmitting the NRS in accordance with the pattern in response. In some embodiments, for each of the sets of consecutive subframes, the first value is an integer between one and four.

In other embodiments, the method further comprises transmitting a System Information Block indicating that the paging occasions are sparse in time relative to a threshold, wherein the paging occasions are consecutive paging occasions. In some such embodiments, for each of the sets of consecutive subframes, the number of consecutive subframes is ten.

In some embodiments, the method further comprises determining the common timing reference based on a System Frame Number.

In some embodiments, the method further comprises determining the common timing reference based on a number of radio frames identifying a discontinuous reception cycle length of the UE.

Further embodiments include a UE configured to determine paging occasions that are associated with an NRS from a plurality of paging occasions based on a common timing reference between a RAN node and the UE.

In some embodiments, the UE is further configured to perform any of the methods described above as implemented by a UE.

In some embodiments, the UE comprises processing circuitry whereby the UE is configured, and interface circuitry communicatively connected to the processing circuitry.

In some embodiments, the UE comprises processing circuitry and a memory, the memory containing instructions executable by the processing circuitry whereby the UE is configured.

Other embodiments include a computer program comprising instructions which, when executed on processing circuitry of a UE, cause the processing circuitry to carry out any one of the methods described above as being implemented by a UE.

Further embodiments include a carrier containing such a computer program. The carrier is one of an electronic signal, optical signal, radio signal, or computer readable storage medium.

Further embodiments include a RAN node configured to transmit, to a UE, an NRS on paging occasions based on a common timing reference between the RAN node and the UE.

In some embodiments, the RAN node is further configured to perform any of the methods described above as implemented by a RAN node.

In some embodiments, the RAN node comprises processing circuitry whereby the RAN node is configured, and interface circuitry communicatively connected to the processing circuitry.

In some embodiments, the RAN node comprises processing circuitry and a memory, the memory containing instructions executable by the processing circuitry whereby the RAN node is configured.

Other embodiments include a computer program comprising instructions which, when executed on processing circuitry of a RAN node, cause the processing circuitry to carry out any one of the methods described above as being implemented by a RAN node.

Further embodiments include a carrier containing such a computer program. The carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements.

FIG. 2 is a table illustrating an example by which a paging occasion subframe may be obtained from other information, according to one or more embodiments of the present disclosure.

FIGS. 3A and 3B are schematic block diagrams illustrating example NB-IoT frame structures, according to different embodiments of the present disclosure.

FIGS. 5A and 5B are schematic block diagrams illustrating example NB-IoT frame structures in which decimation patterns use different numbers of subframes, according to different embodiments of the present disclosure.

FIGS. 6A and 6B are schematic block diagrams illustrating example NB-IoT frame structures in which different decimation patterns are used depending on the cell ID, according to different embodiments of the present disclosure.

DETAILED DESCRIPTION

Figure 1:
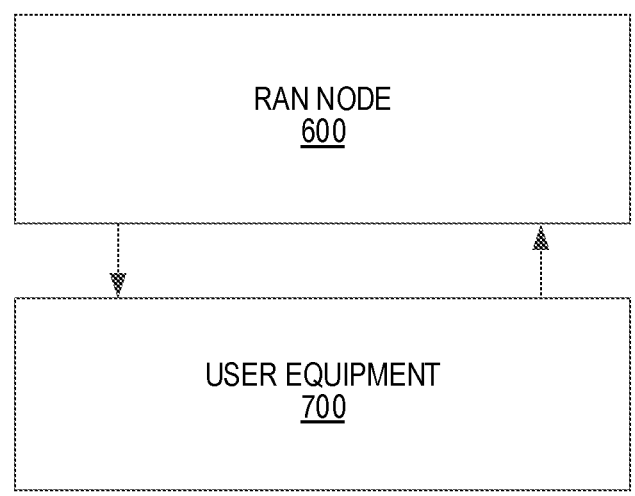
FIG. 1 is a schematic block diagram of an example NB-IoT system, according to one or more embodiments of the present disclosure.

FIG. 1 illustrates an example NB-IoT system comprising a RAN node and a UE. The RAN node and the UE are configured to exchange radio signals. According to embodiments, the RAN node transmits signals received by the UE on a downlink and/or the UE transmits signals received by the RAN node on an uplink.

A UE that is an NB-IoT device generally needs to monitor the Narrowband Physical Downlink Control Channel (NPDCCH) to check whether a paging message is scheduled. However, when monitoring paging in the Rel-14 NB-IoT design on a non-anchor carrier, the NB-IoT device cannot assume that the Narrowband Reference Signal (NRS) is present. Such a design makes it difficult for an NB-IoT device to terminate NPDCCH decoding early when no paging message is being transmitted. This may increase UE power consumption in cells where the NPDCCH is configured with a large number of repetitions, as the UE has to monitor for a long time in order to determine whether the NPDCCH was sent by the network.

One way to address this problem is to allow a number of subframes to contain NRS prior to and/or within the NPDCCH search space of a paging occasion (PO). The purpose of such an approach may be to enable the UE to stop monitoring the NPDCCH search space of a given PO early, since the Downlink Control Information (DCI) would be monitored in such an approach such that the UE would know whether or not there is an upcoming paging message for that UE.

The particular number of subframes that should contain NRS prior to and/or within a PO may depend on a plurality of factors. In some embodiments, these factors include the number of consecutive subframes containing NRS before the PO (hereinafter referred to by the variable "M") and the number of consecutive subframes containing NRS within the NPDCCH search space (hereinafter referred to by the variable "N").

In determining appropriate values of M and N, it may be important to consider fulfilling certain principles when transmitting NRS in association with POs. It may also be important to consider certain principles when determining an appropriate decimation pattern. A decimation pattern is a pattern that determines which POs have subframes with NRS even when no NPDCCH is transmitted.

For example, in some embodiments, it may be advantageous for the decimation pattern to be fair across UEs, e.g., such that all UEs see the same (or similar) percentage of POs that include NRS. It may additionally or alternatively be advantageous for a UE belonging to a given group of UEs monitoring paging in the same PO are able to use the NRS belonging to a PO of a different group in addition to the NRS belonging to a PO of its own UE group. In some embodiments, it may be advantageous for the maximum gap between a PO with NRS and a PO that the UE monitors to not be larger than some threshold (e.g., to ensure that the UE can reliably estimate the signal-to-noise ratio (SNR) for NPDCCH early termination). In some embodiments, POs with NRS are quasi-uniformly or uniformly distributed from the UE perspective. Additionally or alternatively, in some embodiments, POs with NRS are quasi-uniformly or uniformly distributed from the network perspective. Moreover, in some embodiments, a subset of the POs have associated subframes which contain NRS even when no paging NPDCCH is transmitted.

Given the above, according to at least some embodiments, whether or not a decimation pattern applies and/or the particular decimation pattern itself, may be based on the number of POs in a discontinuous reception (DRX) cycle.

Consider an example in which the DRX cycle of a UE is referred to by the variable "T." The default value of T is transmitted in the System Information Block 2 (SIB2). This default cannot be overwritten by a UE specific value. Particular example values of T that may be advantageous in particular embodiments are 128, 256, 512, and 1024 radio frames.

The number of POs in a DRX cycle (hereinafter referred to by the variable "nB") can be expressed in terms of T and broadcast in the System Information Block (SIB). For example, values of nB may be 4T, 2T, T, ½T, ¼T, ⅛T, 1/16T, 1/32T, 1/64T, 1/128T, 1/256T, 1/512T, and 1/1024T.

Accordingly, the decimation pattern of particular embodiments may be based on nB as compared to some threshold (e.g., T/2). For example, when nB is less than a threshold, then all POs may have NRS (i.e., no decimation pattern is applied). When nB is greater than or equal to the threshold, then a decimation pattern is applied, which may depend on the particular value of nB. That is, each nB value at or above the threshold may have a specified decimation pattern. In either case, the particular values of M and/or N may be different for different numbers of POs within a DRX cycle. Alternatively, the values of M and N may be the same for all values of nB below the threshold.

Using a decimation pattern in some cases and not in others as discussed above may be appropriate depending on certain circumstances. For example, when the presence of POs is high (e.g., when nB>=T/2), POs may be close together or even adjacent. As such, it is likely that not all POs will have NRS, and a decimation pattern is appropriate. In contrast, when the presence of POs is sparse in time (e.g., when nB<T/2), then a decimation pattern may be unnecessary or disadvantageous, as all POs may have associated subframes containing NRS.

Given the above, the values of M and N may be specified in order to handle both sparse and non-sparse PO scenarios. For example, sparse PO scenarios may use values of M and N such that M+N=10. Correspondingly, non-sparse scenarios may use values of M and N, and a decimation pattern, that guarantee 10 subframes with NRS near every PO from the network perspective after the decimation pattern is applied. As discussed above, each value of nB may be associated with a corresponding decimation pattern and values of M and N.

Although many different arrangements of NRS may be used according to various embodiments, in general, it may be advantageous to avoid significant NRS gaps (e.g., regardless of whether or not POs are sparse).

UEs are generally permitted to enter into the system at any time. Accordingly, a reference timing for the decimation pattern on POs with associated NRS needs to be defined. To handle the non-sparse scenario (e.g., when nB>=T/2), one potential solution for applying a decimation pattern may include using an offset with respect to a UE's previous POs. This enables UEs monitoring different POs to have an almost equal chance to have NRS associated with its PO after decimation. Further, a UE can use the NRS associated with other UEs' POs also.

However, this approach has some significant flaws. For example, under such an approach it is not clear how the offset can be derived by the UE when the UE is allowed to enter the cell at any arbitrary time. That is, it is unclear how the UE can determine the offset if the offset is defined with respect to previous POs. Indeed, such a solution, by itself, does not address how the UE can identify the first (or previous) PO, not to mention determining an offset relative to a previous PO.

To handle the sparse scenario (e.g., when nB<T/2), one solution is to merely designate a static, predefined value for M (e.g., M=8). However, this approach also has significant flaws. In particular, such an approach is quite inflexible, especially considering the NB-IoT in-band system likely will have to co-exist with other Long Term Evolution (LTE) services. A more flexible solution that improves the co-existence between NB-IoT and LTE would be beneficial.

Moreover, for both the sparse and non-sparse PO presence cases, the separate or joint usage of the variables "M" and "N" (which denote the presence of NRS prior and within the NPDCCH search space) may lead to a discontinuous presence (i.e., gap) of NRS.

By signaling the starting subframe of "M" (i.e., the start of the subframes containing NRS prior to the NPDCCH search space), embodiments of the present disclosure prevent a gap from disrupting the presence of NRS. Signaling the starting subframe of "M" to avoid a gap in the presence of NRS is applicable to both a sparse and a non-sparse presence of POs. Such a solution can be applied if "M" is used alone to provide the number of subframes containing NRS, or if both "M+N" are used to provide the number of subframes containing NRS.

Such a solution can further be used when a set of decimation patterns for POs with associated NRS built on subframe patterns are defined in advance, and the System Frame Number (SFN) is used as reference timing for determining when decimation applies and when decimation does not apply. Moreover, such a solution supports the PO always having in vicinity (i.e., earlier or later in time, depending on the usage of "M" and "N") a configurable number of subframes containing NRS. The starting point of the decimation pattern can be cell-ID dependent or explicitly signaled by the RAN Node (e.g., the eNodeB). Accordingly, to avoid having gaps disrupting the presence of NRS, for both a sparse and a non-sparse presence of POs, embodiments of the present disclosure signal the starting subframe of "M".

On the network side, a simple example embodiment may determine if a decimation pattern is to be used, and if so, provide a decimation pattern for NRS transmission based upon SFN, and provide the values of M and/or N. If not, then the network may provide the value of M and/or N such that M and N does not create a gap (i.e., a non-NRS containing subframe).

On the UE side, a simple example embodiment may determine, from the SIB, whether the UE is camped on a non-anchor carrier. Further, the UE may determine whether a decimation pattern applies from an nB value in the SIB. The UE may also obtain an SFN that contains NRS based by applying an SFN based formula, and obtain a subframe containing NRS based on M and/or N.

Advantageously, the decimation pattern on POs with associated NRS uses the SFN as reference timing as to known when (and in some embodiments, in which paging radio frame) the decimation applies and when it doesn't. A UE can enter into the system at any-time, and depending on the SFN and the decimation pattern the UE may either immediately have NRS subframes associated to its PO or a subsequent PO. The decimation pattern on POs with associated NRS may account for subframe patterns that defined in existing specifications, e.g., to allow for the presence of the POs per paging radio frame, which may be different depending on the number of UE groups. Further, by signaling the starting subframe of "M" (subframes containing NRS prior the NPDCCH search space), a gap disrupting the presence of NRS can be avoided. Indeed, signaling the starting subframe of "M" to avoid a gap in the presence of NRS may be applied when POs are sparse, when POs are not sparse, or both. Moreover, the solution can be applied if "M" is used alone to provide the number of subframes containing NRS, or if both "M+N" are used to provide the number of subframes containing NRS. Example embodiments will now be provided in which certain additional parameters will be used. According to such example, for sake of explanation and without limitation, the parameter UE_ID is a UE identifier determined by taking its International Mobile Subscriber Identity (IMSI) mod 4096. In addition, a Paging Frame (PF) is given by the equation SFN mod T=(T div N)*(UE_ID mod N), wherein N is the lesser of T and nB.

The PO subframe may be obtained using a table such as the one illustrated in FIG. 2 based on the values of Ns and i_s. For purposes of explanation and not limitation, Ns is the greater of 1 and nB/T, whereas i_s is given by floor (UE_ID/N) mod Ns.

In the table of FIG. 2, Ns refers to whether there is one, two, or four UE groups, whereas "i_s" (which can be equal to 0, 1, 2, or 3) refers to the actual UE groups. In the table, the value corresponding to the coordinates given by "Ns" and "i_s" indicates the subframe to which the PO is mapped. For example, when Ns=1 (i.e., there is only one UE group) and i_s=0 (i.e., the UE group is Group 0), then the PO is mapped to a paging radio frame in subframe number 9.

According to embodiments of the present disclosure, when POs are sparse in time, a decimation pattern is not applied and ten consecutive subframes containing NRS are used. The values of M and N (as discussed above) may vary, provided that they add up to ten.

When both M and N are non-zero values, it may be important to know the starting point of M, which refers to the subframes containing NRS prior to the NPDCCH search space of a PO. The NB-IoT frame structures illustrated in FIGS. 3A and 3B distinguish between two different situations that depend upon the starting point of M.

Figures 3A, 3B:
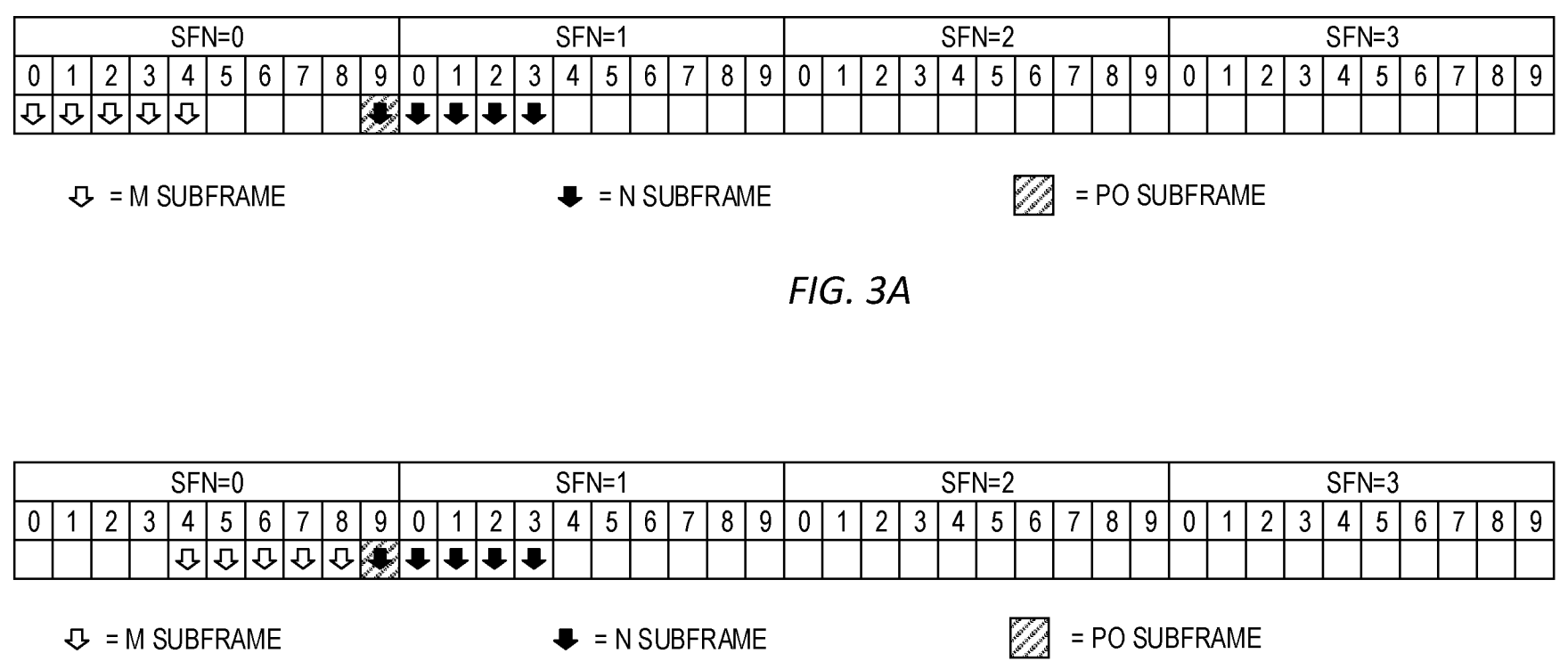

FIG. 3A illustrates an example in which M creates a gap. In this example, M starts from the leftmost subframe and both "M" and "N" are ≠0. Given that the NB-IoT frames each comprise ten subframes, these circumstances will always produce a gap between the M subframes and the N subframes. For illustration purposes, nB=T/4 in this example, whereas M and N are both set to 5 such that M+N=10 is fulfilled.

FIG. 3B also illustrates an example in which nB=T/4 and in which M and N are both set to 5 such that M+N=10 is fulfilled. However, in contrast to FIG. 3A, FIG. 3B illustrates an example in which M does not create a gap. In the example of FIG. 3B, M is flushed to the right such that one of its subframes is adjacent to the PO and both M and N are ≠0. When this occurs, there will always be a contiguous transmission of NRS with no gap between M and N.

Embodiments of the present disclosure ensure that M and N are adjacent to each other under sparse PO conditions, such that there is no gap (i.e., intervening subframe) between M and N. In some embodiments, M and N can respectively have the values ten and zero (or vice versa) to fulfill with the condition M+N=10, thereby producing no gap. Such an embodiment produces either ten subframes in a row containing NRS ending at the PO or 10 subframes in a row containing NRS starting at the PO within the NPDCCH search space.

In other embodiments, M and N are both non-zero, M is flushed to the right such that the M subframes are adjacent to the N subframes, and M and N may be any combination of values between one and nine such that the condition M+N=10 is fulfilled.

In yet other embodiments, M and N may be any combination of values between one and nine such that the condition M+N=10 is fulfilled, and the starting subframe of M is signaled such that M and N are adjacent to each other.

Other embodiments are directed to conditions in which POs are abundant (i.e., when POs are not sparse). In such embodiments, a decimation pattern is applied. Continuing with the example in which the threshold for determining whether POs are sparse or non-sparse is T/2, non-sparse scenarios may include nB=4T, 2T, T, and T/2, which encompasses the presence of four UE groups (when nB=4T), two UE groups (when nB=2T), and one UE group (when nB=T or nB=T/2). Each of these scenarios may require applying a different respective decimation pattern.

To avoid timing ambiguities between the UE and the RAN node, in some embodiments, the decimation pattern is determined based on a common timing reference (e.g., SFN) or a predetermined timing (e.g., an absolute starting time). Although SFN is used as example to describe embodiments using a common timing reference, the embodiments of this disclosure are not limited to this particular common timing reference. Indeed, the SFN can be replaced with any other timing reference that is commonly common determined, unambiguously, between a UE and a RAN node.

A set of decimation patterns for POs with associated NRS may be built on subframe patterns and use SFN as the reference timing. The general form of the SFN that contains NRS subframes that can be used by a UE at a PO may be described by the equation:

$$SFN_{NRS} = \left(\left\lfloor\left(\frac{a-SFN}{b}\right)-c\right\rfloor*d\right)+e \qquad (1)$$

and in some cases as:

$$SFN_{NRS} = \left(f+\left\lfloor\frac{SFN-g}{h}\right\rfloor*i\right) \qquad (2)$$

where a, b, c, d, e, f, g, h and i are integers. Also, if allowed, one or more of a, b c, d, e, f, g, h, and i can be set to 0. Moreover, the selection of one or more of the integer numbers in the above equations may depend on the cell-ID and/or one or more of the integer numbers in the above equations may be updated via higher layer signaling.

Example decimation patterns for two UE groups (e.g., when nB=2T) and one UE group (e.g., when nB=T or when nB=T/2) are described below. Note that the decimation pattern of a particular UE group may be different when there are different numbers of UE groups. For example, the decimation patterns of UE groups 0 and 1 when there are two UE groups may be different when there are four UE groups instead.

Figure 4:
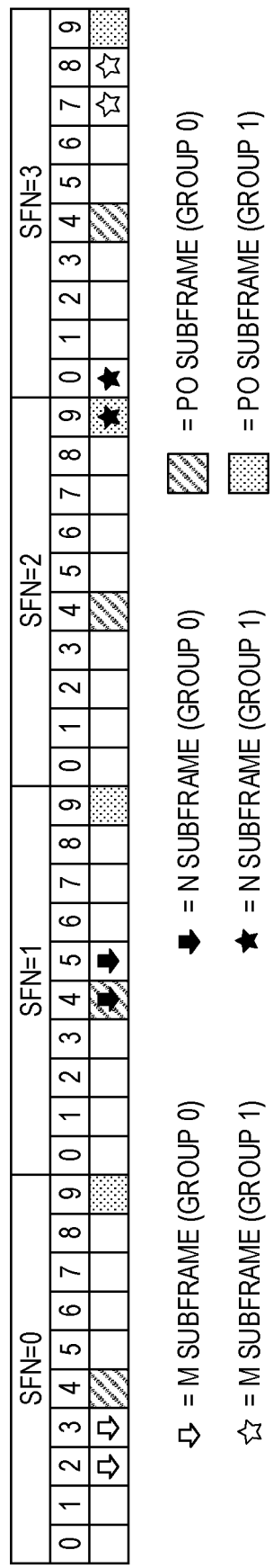
FIG. 4 is a schematic block diagram illustrating an example NB-IoT frame structure in which paging occasion for different UE groups occur, according to one or more embodiments of the present disclosure.

FIG. 4 illustrates an example decimation pattern for two UE groups (e.g., nB=2T) in which only two subframes containing NRS are associated with a given PO, if any. Although only two subframes are associated with each PO having subframes containing NRS associated, other embodiments may have a different number of subframes containing NRS associated (e.g., a configurable number of subframes containing NRS between 1 and 4).

In the example of FIG. 4, a four subframe pattern is illustrated. The four subframe pattern repeats as the SFN changes, such that no offset need be specified.

According to embodiments involving two UE groups, when SFN mod 4 is equal to 0 or 1, UE group 0 is active and UE group 1 has both M and N configured to zero. For UE group 0 at SFN mod 4=0, M is non-zero (e.g., configured to either 1, 2, 3, or 4) and N is zero for UE group 0. For UE group 0 at SFN mod 4=1, N is non-zero (e.g., configured to either 1, 2, 3, or 4) and M is zero.

Correspondingly, when SFN mod 4 is equal to 2 or 3, UE group 1 is active and UE group 0 has both M and N configured to zero. For UE group 1 at SFN mod 4=2, N is non-zero (e.g., configured to either 1, 2, 3, or 4) and M is zero. For UE group 1 at SFN mod 4=3, M is non-zero (e.g., configured to either 1, 2, 3, or 4) and N is zero.

Expressed differently, when $$SFN = \left\lfloor\left(\frac{4-SFN}{4}\right)-1\right\rfloor*4,$$

then UE group 0 will have subframes containing NRS by configuring M to be either 1, 2, 3, or 4 while setting N=0, whereas UE group 1 sets both M and N to 0. When $$SFN = \left(\left\lfloor\left(\frac{4-SFN}{4}\right)-1\right\rfloor*4\right)+1,$$

then UE group 0 will have subframes containing NRS by configuring N to be either 1, 2, 3, or 4 and setting M=0, whereas UE group 1 sets both "M" and "N" to 0. When $$SFN = 2+\left(\left\lfloor\left(\frac{6-SFN}{6}\right)-1\right\rfloor*4\right),$$

then UE group 1 will have subframes containing NRS by configuring N to be either 1, 2, 3, or 4 while setting M=0, whereas UE group 0 sets both M and N to 0. When $$SFN = \left(2+\left(\left\lfloor\left(\frac{6-SFN}{6}\right)-1\right\rfloor*4\right)\right)+1,$$

then UE group 1 will have subframes containing NRS by configuring M to be either 1, 2, 3, or 4 while setting N=0, whereas UE group 0 sets both M and N to 0.

Decimation patterns consistent with the above and FIG. 4 may guarantee that near every PO there will be either 1, 2, 3, or 4 subframes that contain NRS, depending on the configuration of M and N which alternate according to a pattern. In some embodiments, the configuration of M is consistent for odd radio frames and the configuration of N is consistent for even radio frames, or vice versa.

Figures 5A, 5B:
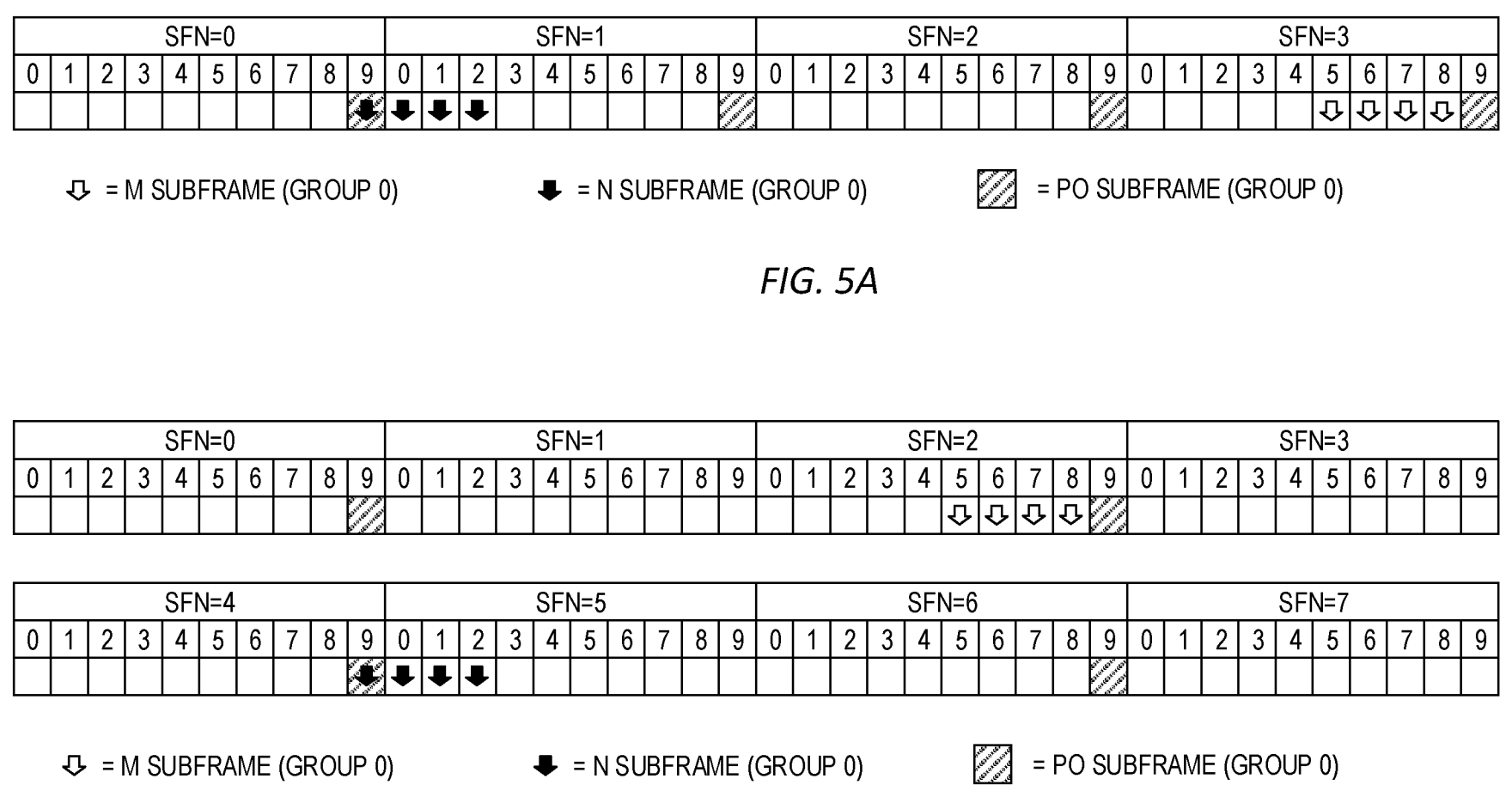

The decimation pattern of UE group 0 under single UE group scenarios (e.g., nB=T and nB=T/2) may be different than that which UE group 0 has in two and/or four UE group scenarios, for example. FIGS. 5A and 5B illustrate example decimation patterns for one UE group using four and eight subframes (respectively) that contain NRS associated to a given PO. As with other of the example scenarios above, the number of subframes containing NRS in this example are configurable to a value from 1 to 4. The pattern shown in FIG. 5A may be appropriate when nB=T, whereas the pattern in FIG. 5B may be appropriate when nB=T/2.

According to embodiments involving one UE group, when SFN mod 4 is equal to 0, N is non-zero (e.g., configured to either 1, 2, 3, or 4) and M is zero. When SFN mod 4 is equal to 3, M is non-zero (e.g., configured to either 1, 2, 3, or 4) and N is zero. Otherwise, both M and N are zero.

Expressed differently, when $$SFN = \left\lfloor\left(\frac{4-SFN}{4}\right)-1\right\rfloor*4,$$

then UE group 0 will have subframes containing NRS by configuring N to be either 1, 2, 3, or 4 and setting M=0. When $$SFN = \left(2+\left(\left\lfloor\left(\frac{6-SFN}{6}\right)-1\right\rfloor*4\right)\right)+1,$$

then UE group 0 will have subframes containing NRS by configuring M to be either 1, 2, 3, or 4 and N=0.

As with previous examples, in the example of FIG. 5A, the four subframe pattern repeats as the SFN changes, such that no offset need be specified. In some embodiments, the decimation pattern rotates within a DRX cycle the presence of NRS in odd and even radio frames, and guarantees that nearby every PO there will be either 1, 2, 3, or 4 subframes containing NRS. In some embodiments, the number of subframes will depend on the configuration of M and N in the odd and even radio frames respectively.

FIG. 5B illustrates an example in which POs are at the limit of being considered a sparse case (e.g., when nB=T/2)

and in which POs are limited to even radio frames. Thus, using odd and even radio frames to rotate the location of the subframes containing NRS is not possible. Thus, the decimation pattern applies on even radio frames only.

According to embodiments consistent with FIG. 5B, when SFN mod 8 is equal to 2, M is non-zero (e.g., configured to either 1, 2, 3, or 4) and N is zero. When SFN mod 8 is equal to 4, N is non-zero (e.g., configured to either 1, 2, 3, or 4) and M is zero. Otherwise, both M and N are zero.

Expressed differently, when $$SFN = \left(2 + \left\lfloor \frac{SFN-2}{8} \right\rfloor * 8\right),$$

then the UE group 0 will have subframes containing NRS by configuring M to be either 1, 2, 3, or 4 and setting N=0. When $$SFN = \left(4 + \left\lfloor \frac{SFN-4}{8} \right\rfloor * 8\right)$$

then the UE group 0 will have subframes containing NRS by configuring N to be either 1, 2, 3, or 4 and setting M=0. Alternatively, M can be configured to be either 1, 2, 3, or 4 and N can be set to zero.

As with previous examples, no offset is required, since the SFN-based operations are used to alternate the presence of NRS.

Figures 6A, 6B:
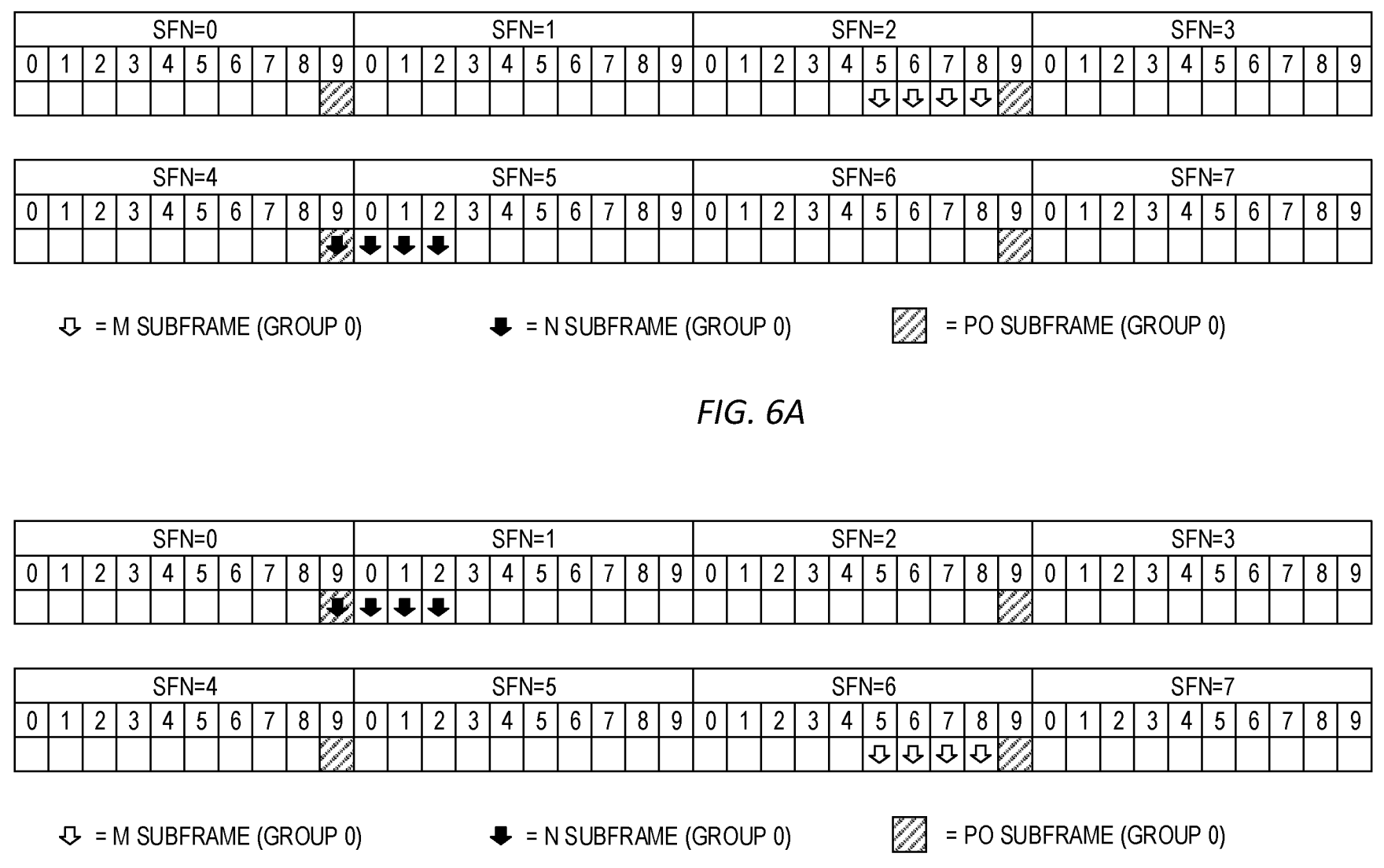

According to embodiments, the Cell_ID can be used to alternate the starting point of the decimation pattern. FIGS. 6A and 6B illustrate example decimation patterns for One UE group when nB=T/2. The example of FIG. 6A reflects the decimation pattern when the Cell_ID is odd, whereas the example of FIG. 6B reflects the decimation pattern when the Cell_ID is even.

As shown in FIG. 6A (i.e., the odd Cell_ID example), when SFN mod 8=2, M is set to either 1, 2, 3, or 4, and N is set to zero. When SFN mod 8=4, M is set to zero and N is set to either 1, 2, 3, or 4.

Expressed differently, when $$SFN == \left(2 + \left\lfloor \frac{SFN-2}{8} \right\rfloor * 8\right),$$

then the UE group 0 will have subframes containing NRS by configuring M to be either 1, 2, 3, or 4 and setting N=0. When $$SFN == \left(4 + \left\lfloor \frac{SFN-4}{8} \right\rfloor * 8\right),$$

then the UE group 0 will have subframes containing NRS by configuring N to be either 1, 2, 3, or 4 and setting M=0.

In contrast, as shown in FIG. 6B (i.e., the even Cell_ID example), when SFN mod 8=0, N is set to either 1, 2, 3, or 4, and M is set to zero. When SFN mod 8=6, N is set to zero and M is set to either 1, 2, 3, or 4.

Expressed differently, when $$SFN == \left(\left\lfloor \frac{SFN}{8} \right\rfloor * 8\right),$$

then the UE group 0 will have subframes containing NRS by configuring N to be either 1, 2, 3, or 4 and setting M=0. When $$SFN == \left(6 + \left\lfloor \frac{SFN-6}{8} \right\rfloor * 8\right),$$

then the UE group 0 will have subframes containing NRS by configuring M to be either 1, 2, 3, or 4 and setting N=0.

Alternatively, a default configuration can specify that the values X=2 and Y=4 are to be applied such that when $$SFN == \left(X + \left\lfloor \frac{SFN-X}{8} \right\rfloor * 8\right),$$

then the UE group 0 will have subframes containing NRS by configuring M to be either 1, 2, 3, or 4 and setting N=0, whereas when $$SFN == \left(Y + \left\lfloor \frac{SFN-Y}{8} \right\rfloor * 8\right),$$

then the UE group 0 will have subframes containing NRS by configuring N to be either 1, 2, 3, or 4 and setting M=0. The values of X and Y may subsequently be changed by the network to shift the decimation pattern as desired. For example, if at some point the network wants to change the location of the NRS, it can broadcast X=0 and Y=6.

Figure 7:
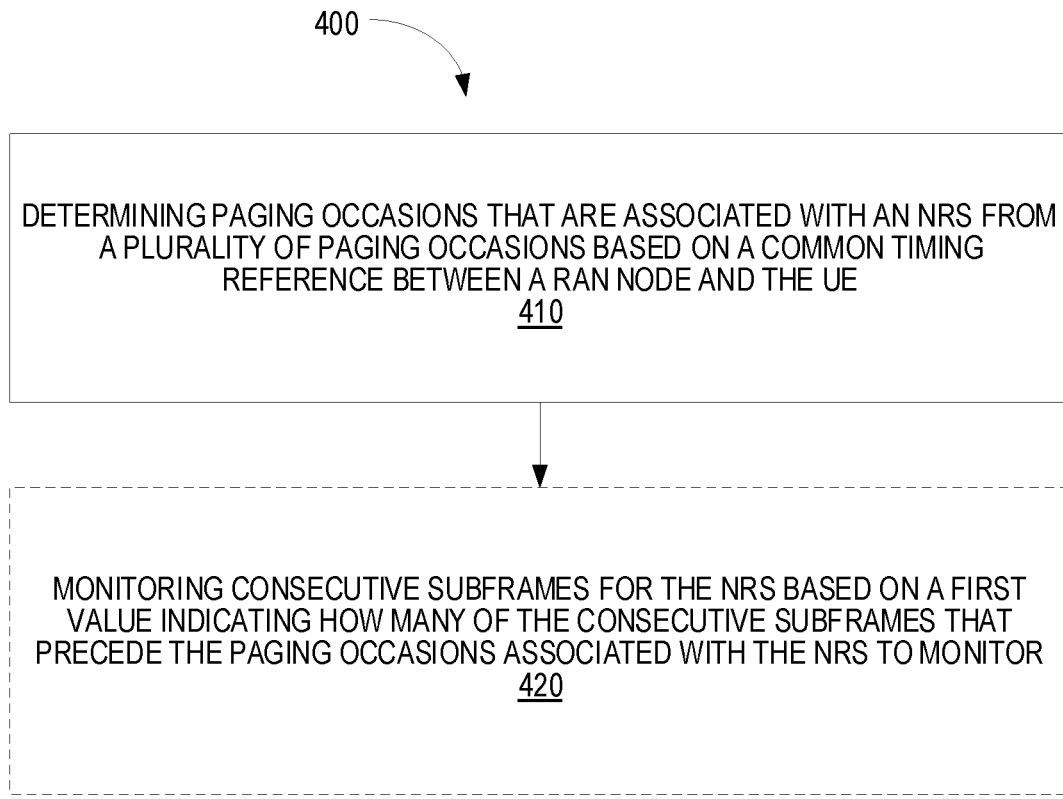
FIG. 7 is a flow diagram illustrating an example method implemented by a user equipment, according to one or more embodiments of the present disclosure.

In view of all of the above, embodiments of the present disclosure include a method 400 implemented by a UE 700 (e.g., a wireless terminal), as shown in FIG. 7. The method 400 comprises determining paging occasions that are associated with an NRS from a plurality of paging occasions based on a common timing reference between a RAN node 600 and the UE 700 (block 410). In some embodiments, the method 400 further comprises monitoring consecutive subframes for the NRS based on a first value indicating how many of the consecutive subframes that precede the paging occasions associated with the NRS to monitor (block 420).

Figure 8:
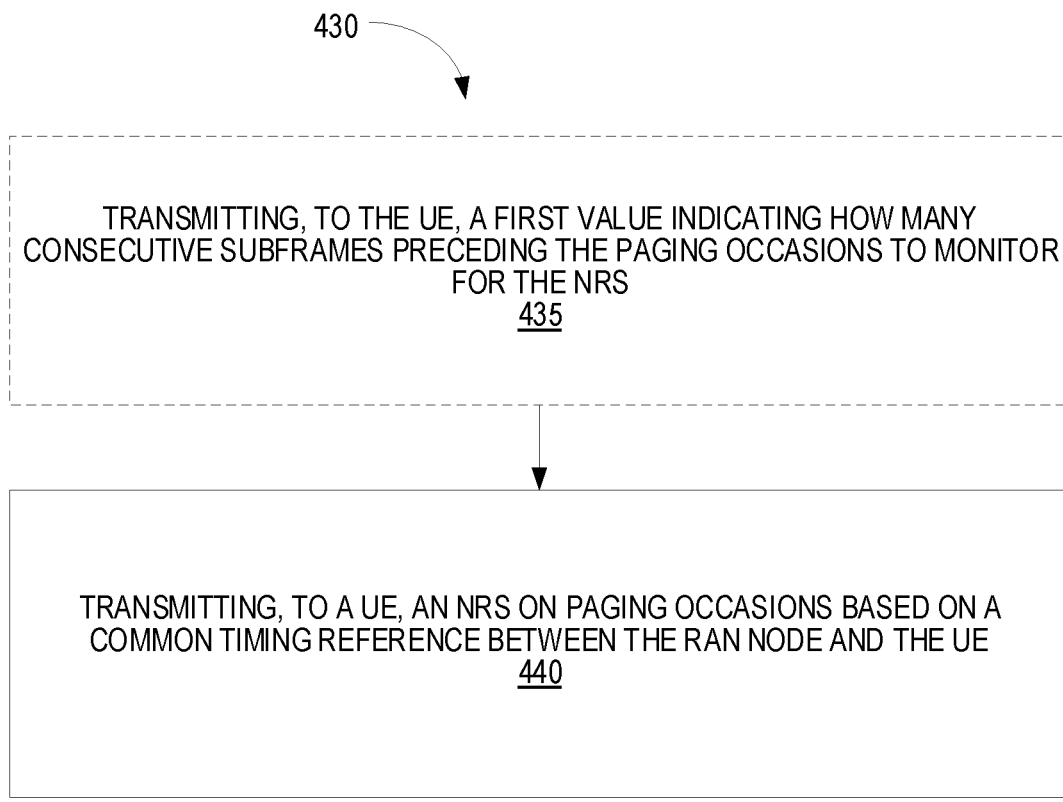
FIG. 8 is a flow diagram illustrating an example method implemented by a RAN node, according to one or more embodiments of the present disclosure.

Other embodiments of the present disclosure include a method 430 implemented by a RAN node 600 (e.g., an NB-IoT base station) as shown in FIG. 8. The method 430 comprises transmitting, to a UE 700, an NRS on paging occasions based on a common timing reference between the RAN node 600 and the UE 700 (block 440). In some embodiments, the method 430 further comprises transmitting, to the UE 700, a first value indicating how many consecutive subframes preceding the paging occasions to monitor for the NRS (block 435).

Figure 9:
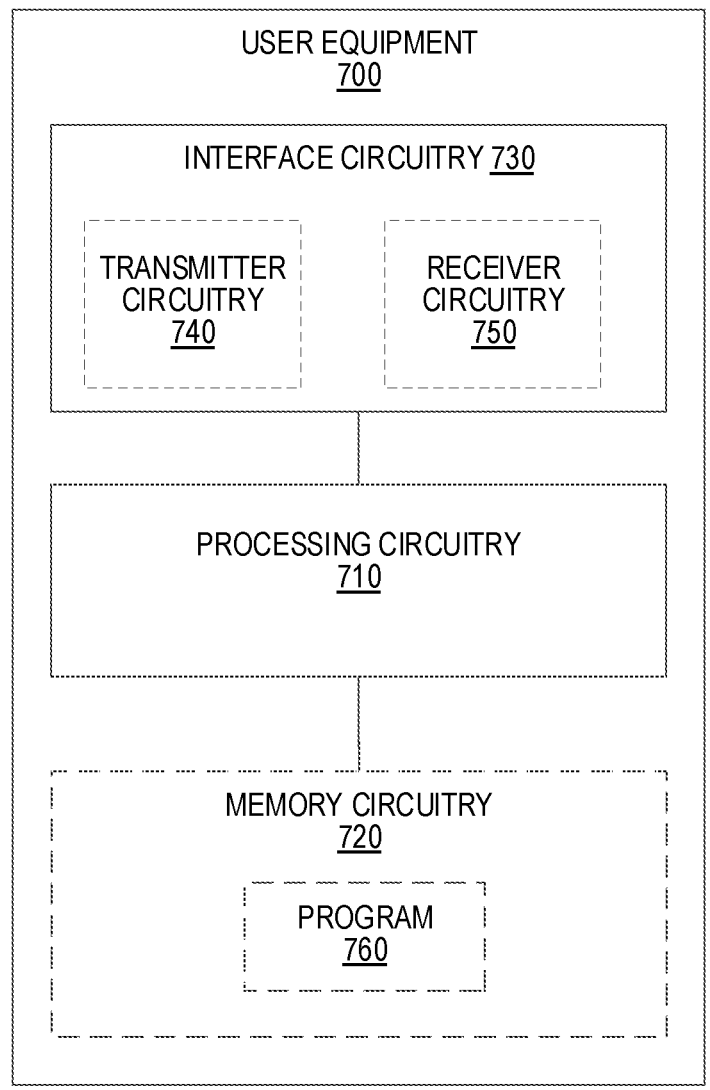
FIG. 9 is a schematic block diagram illustrating an example user equipment, according to one or more embodiments of the present disclosure.

Other embodiments of the present disclosure include a UE 700, as shown in FIG. 9. The UE of FIG. 9 comprises processing circuitry 710 and interface circuitry 730. The processing circuitry 710 is communicatively coupled to the interface circuitry 730, e.g., via one or more buses. In some embodiments, the proxy server 700 further comprises memory circuitry 720 that is communicatively coupled to the processing circuitry 710, e.g., via one or more buses.

According to particular embodiments, the processing circuitry 710 is configured to perform one or more of the methods described herein (e.g., the method 400).

Figure 10:
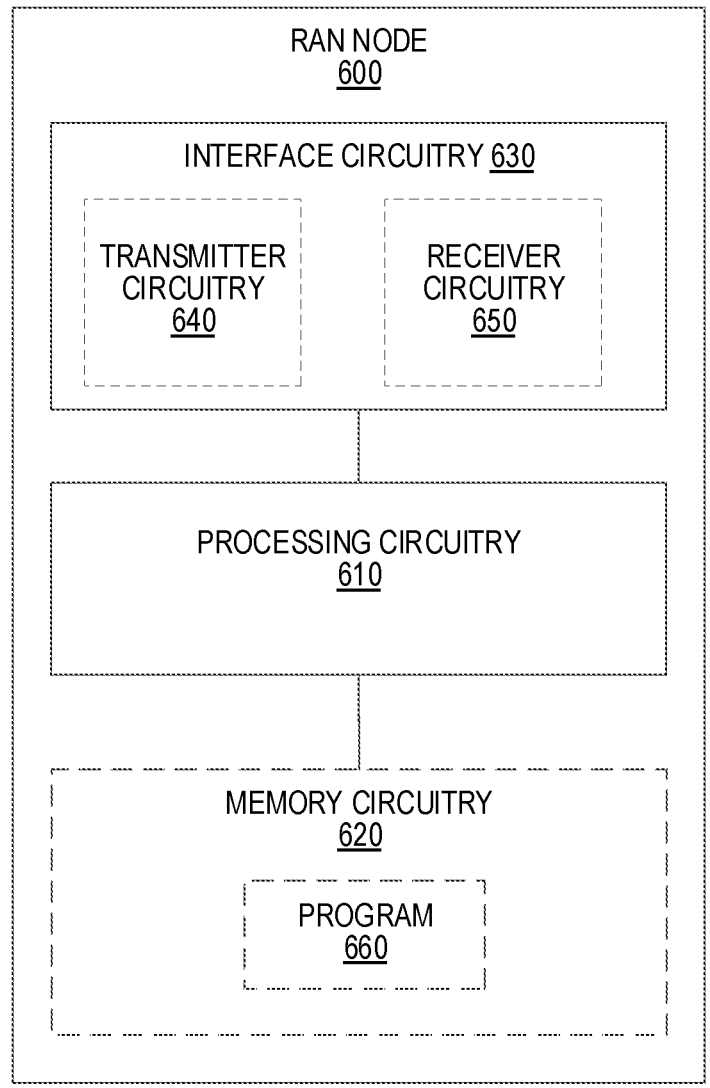
FIG. 10 is a schematic block diagram illustrating an example RAN node, according to one or more embodiments of the present disclosure.

Other embodiments of the present disclosure include a RAN node 600, as shown in FIG. 10. The RAN node 600 of FIG. 10 comprises processing circuitry 610 and interface circuitry 630. The processing circuitry 610 is communicatively coupled to the interface circuitry 630, e.g., via one or more buses. In some embodiments, the network node 600 further comprises memory circuitry 620 that is communicatively coupled to the processing circuitry 610, e.g., via one or more buses. According to particular embodiments, the processing circuitry 610 is configured to perform one or more of the methods described herein (e.g., the method 430).

The processing circuitry 610, 710 of each device 600, 700 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 610, 710 may be programmable hardware capable of executing software instructions of a respective computer program 660, 760 stored in respective memory circuitry 620, 720 whereby the corresponding processing circuitry 610, 710 is configured. The memory circuitry 620, 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 630, 730 may be a controller hub configured to control the input and output (I/O) data paths of its respective device 600, 700. Such I/O data paths may include data paths for exchanging signals over a communications network, data paths for exchanging signals with a user, and/or data paths for exchanging data internally among components of the device 600, 700. For example, the interface circuitry 630, 730 may comprise a transceiver configured to send and receive communication signals over one or more of a cellular network, Ethernet network, or optical network. The interface circuitry 630, 730 may be implemented as a unitary physical component, or as a plurality of physical components that are contiguously or separately arranged, any of which may be communicatively coupled to any other, or may communicate with any other via the processing circuitry 610, 710. For example, the interface circuitry 630, 730 may comprise transmitter circuitry 640, 740 configured to send communication signals over a communications network and receiver circuitry 650, 750 configured to receive communication signals over the communications network. Other embodiments may include other permutations and/or arrangements of the above and/or their equivalents.

According to embodiments of the UE 700, the processing circuitry 710 is configured to determine paging occasions that are associated with an NRS from a plurality of paging occasions based on a common timing reference between a RAN node 600 and the UE 700.

According to embodiments of the RAN node 600, the processing circuitry 610 is configured to transmit, to a UE 700, an NRS on paging occasions based on a common timing reference between the RAN node 600 and the UE 700.

Other embodiments of the present disclosure include corresponding computer programs. In one such embodiment, the computer program comprises instructions which, when executed on processing circuitry of a RAN node 600, cause the RAN node device 600 to carry out any of the processing described above with respect to a RAN node 600. In another such embodiment, the computer program comprises instructions which, when executed on processing circuitry of a UE 700, cause the UE 700 to carry out any of the processing described above with respect to a UE 700. A computer program in either regard may comprise one or more code modules corresponding to the means or units described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 11:
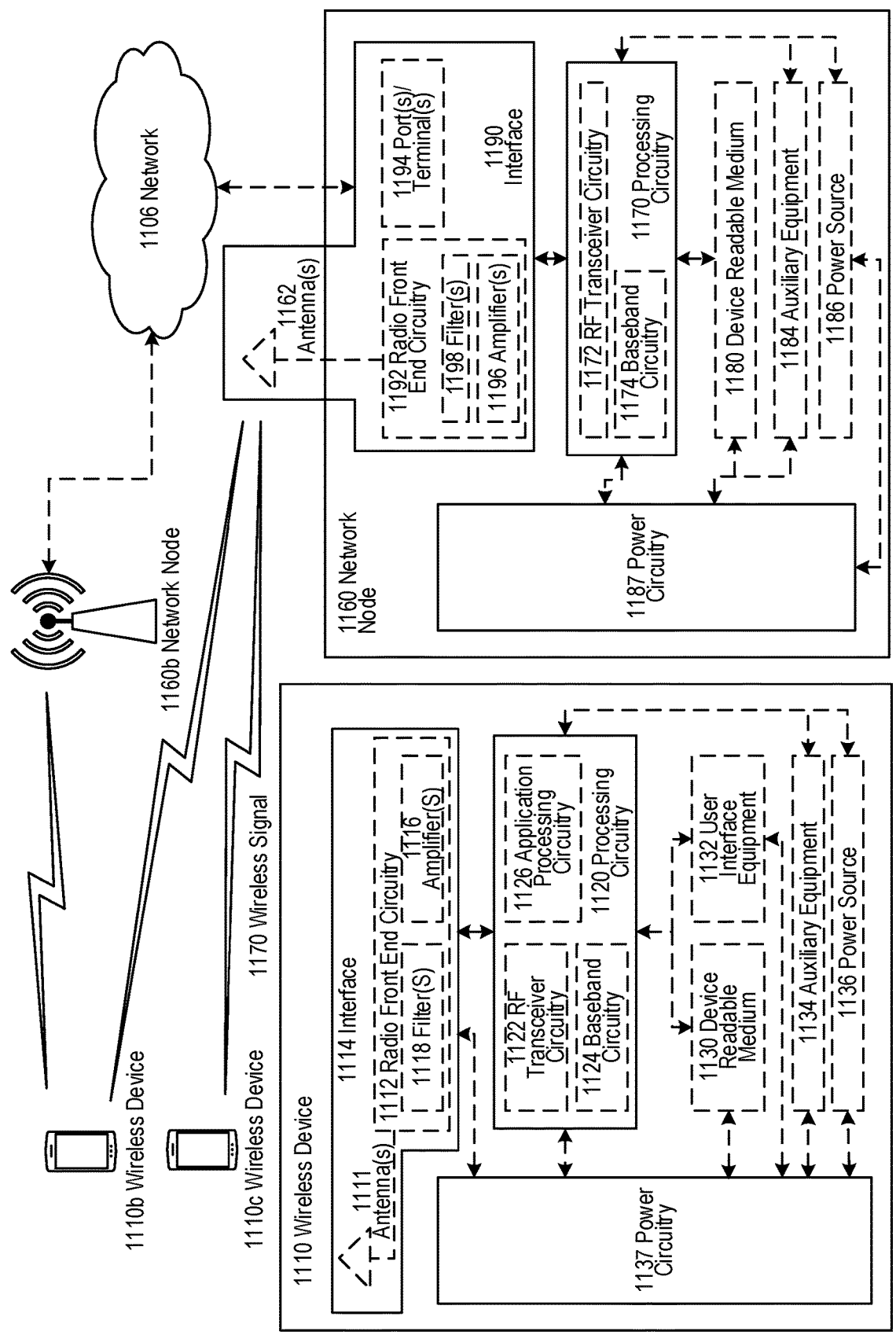
FIG. 11 is a schematic block diagram illustrating an example wireless network, according to one or more embodiments of the present disclosure.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), and base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
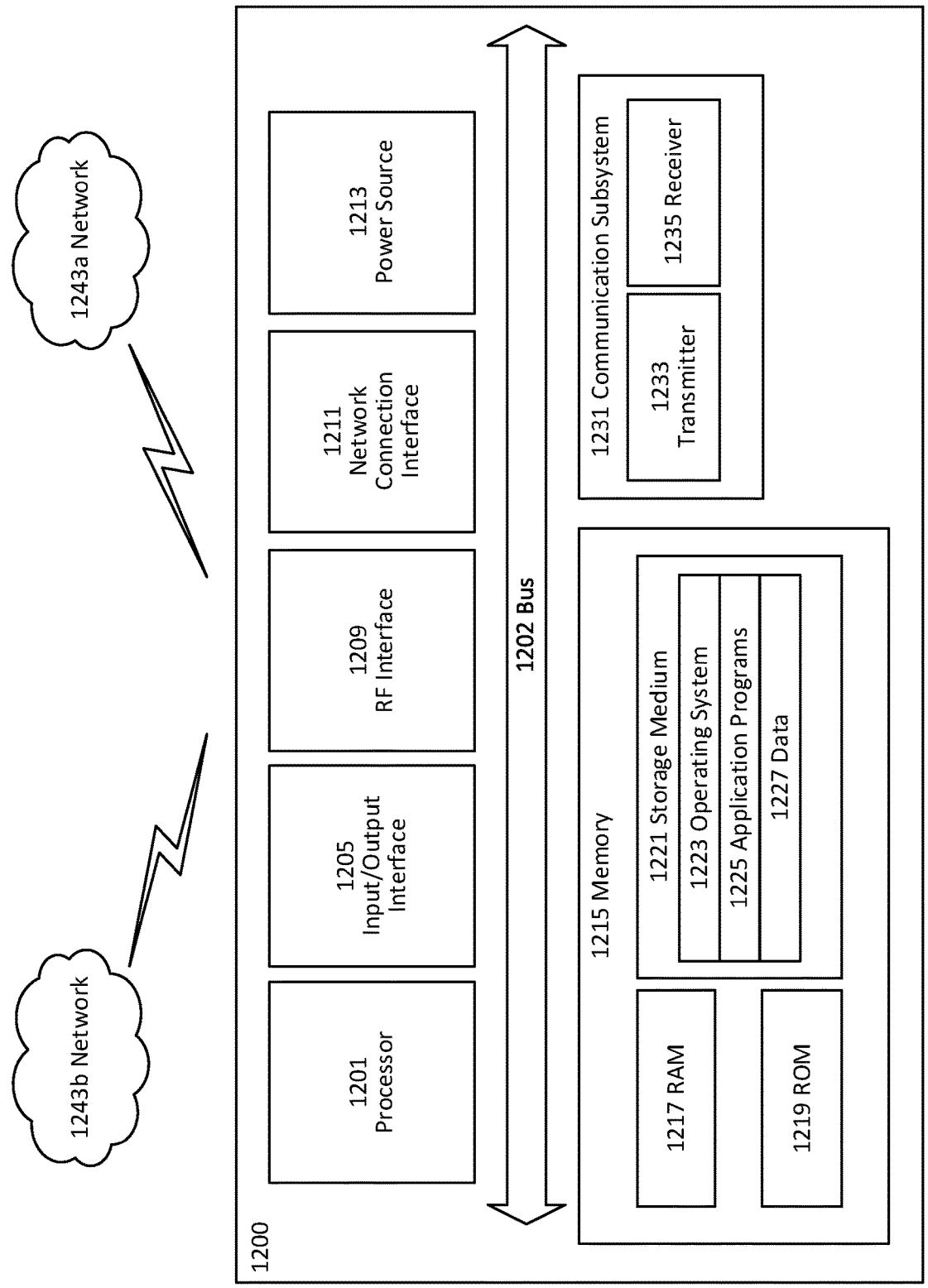
FIG. 12 is a schematic block diagram illustrating an example UE, according to one or more embodiments of the present disclosure.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
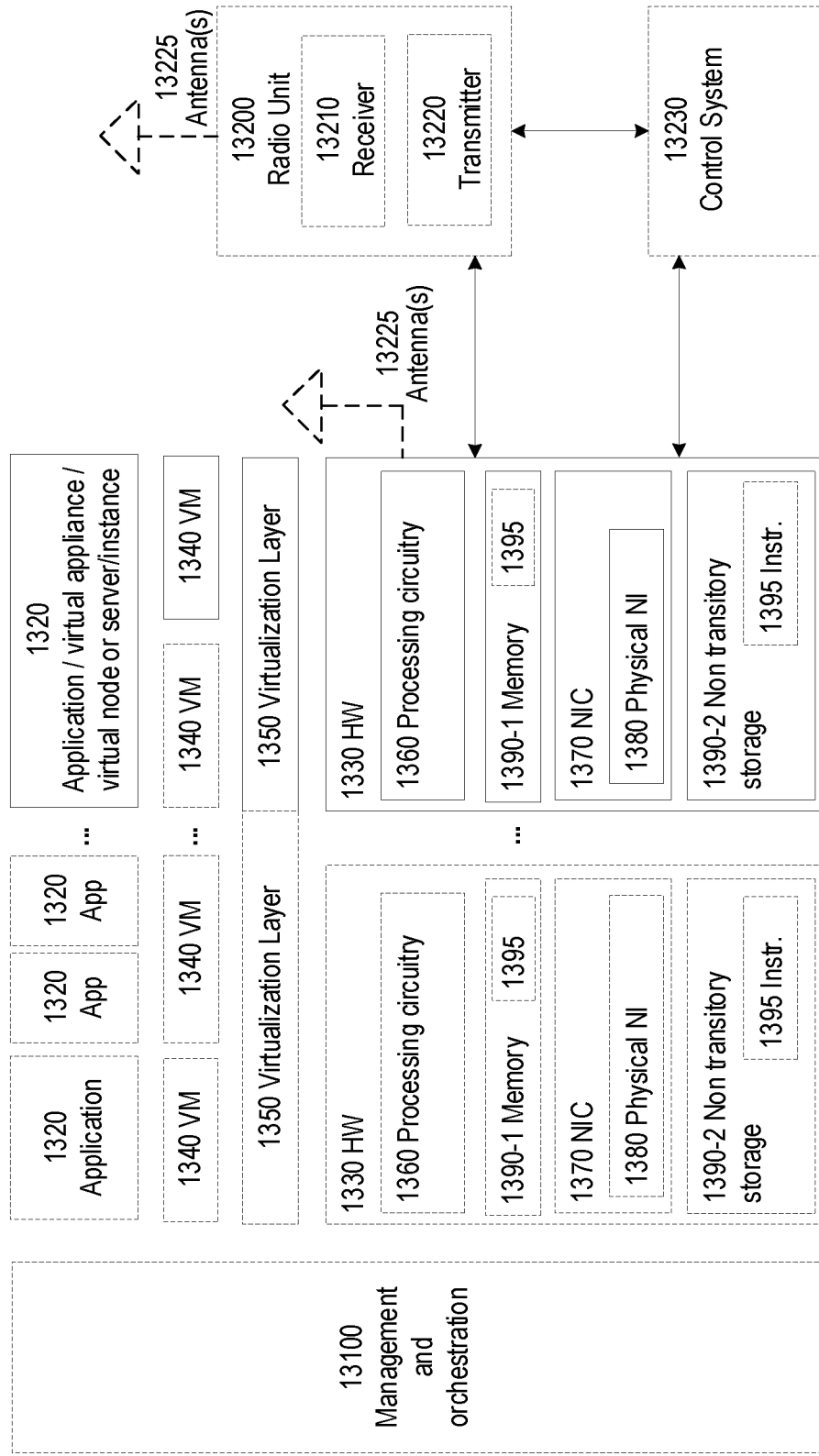
FIG. 13 is a schematic block diagram illustrating an example of a virtualization environment, according to one or more embodiments of the present disclosure.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 14:
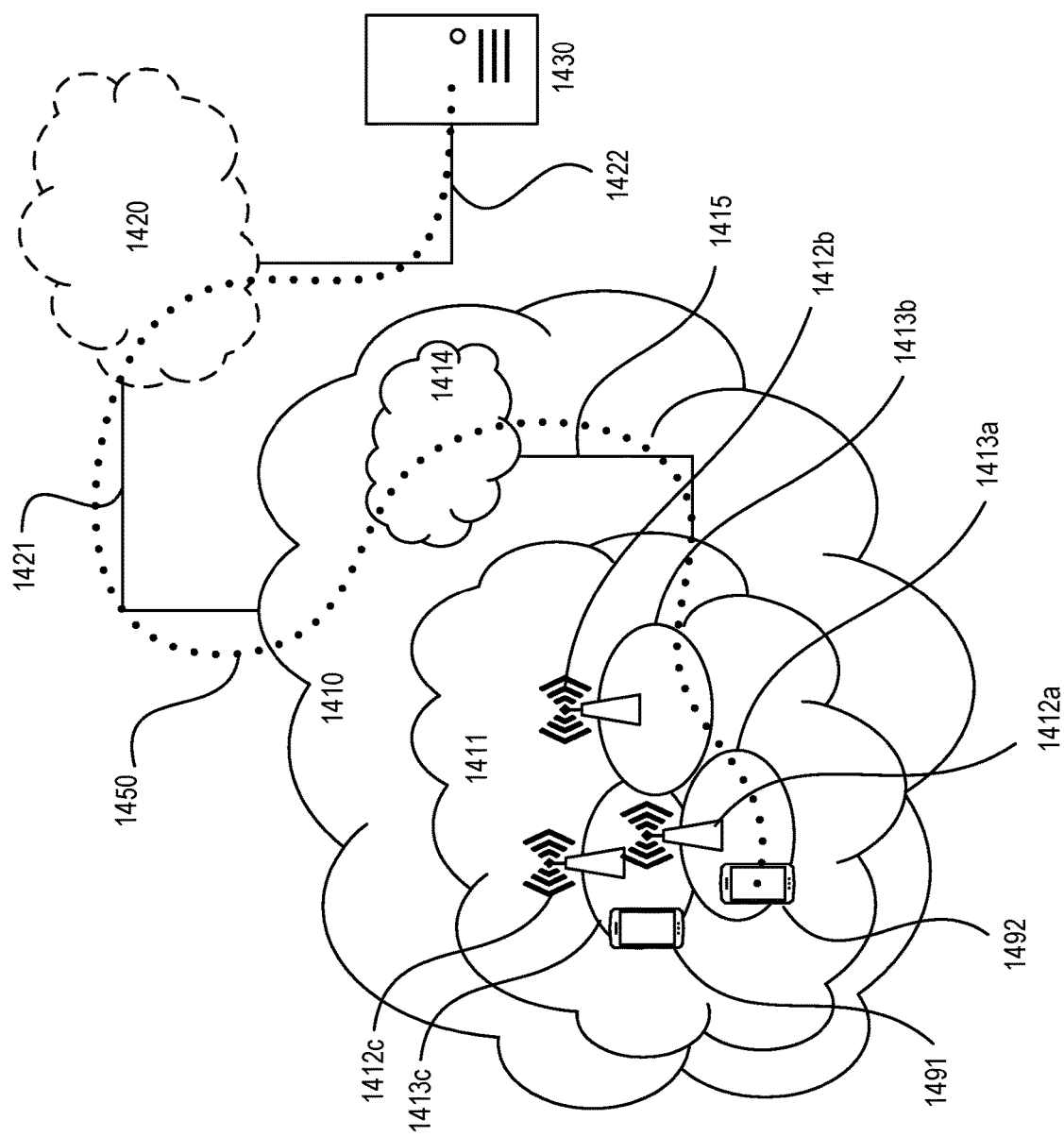
FIG. 14 is a schematic illustrating an example telecommunication network, according to one or more embodiments of the present disclosure.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
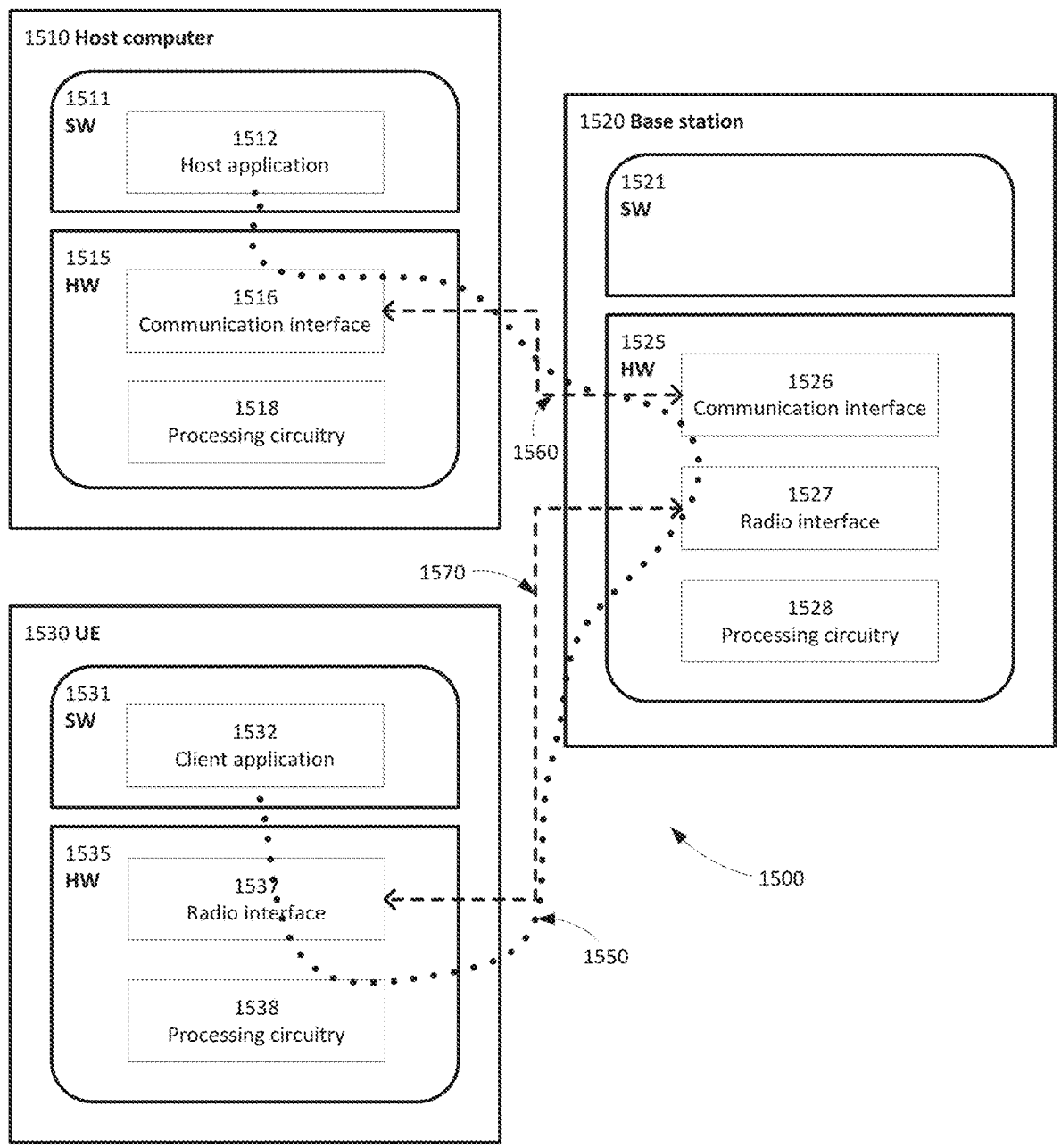
FIG. 15 is a schematic block diagram illustrating an example communication system, according to one or more embodiments of the present disclosure.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may enhance UE mobility between RAN nodes and thereby provide benefits such as reduced UE power consumption and/or more efficient detection of NRS, among other things.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
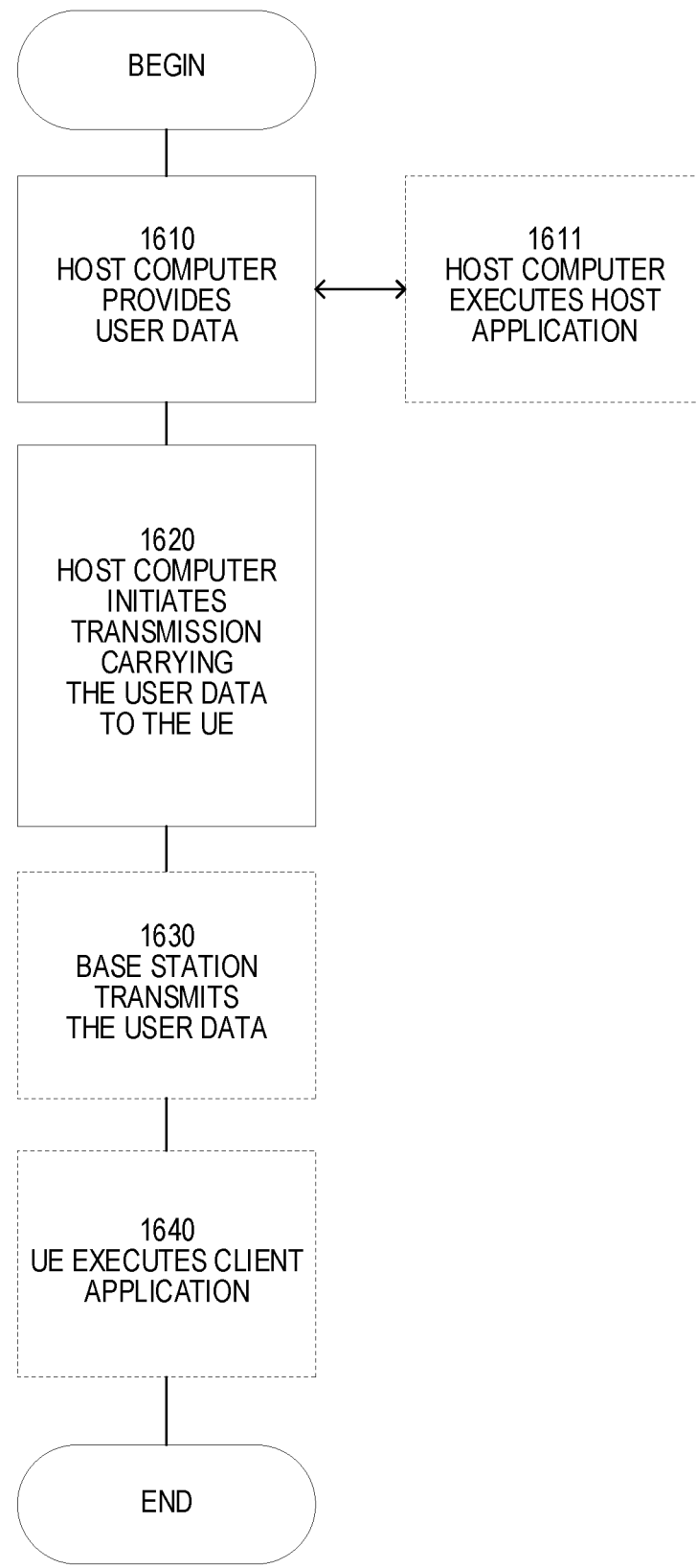
FIGS. 16-19 are flow diagrams, each of which illustrates an example method, according to particular embodiments of the present disclosure.

FIG. 16 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
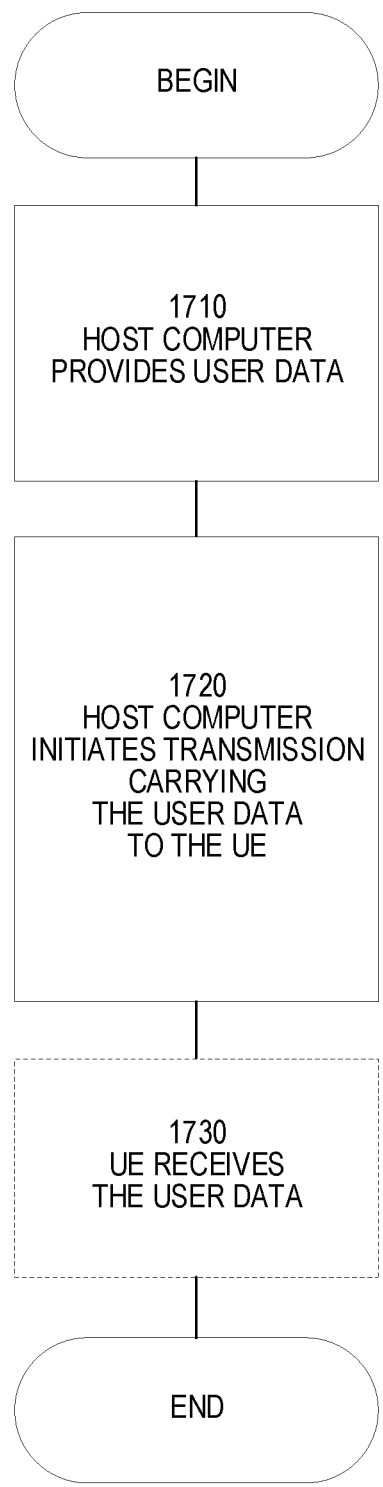

FIG. 17 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
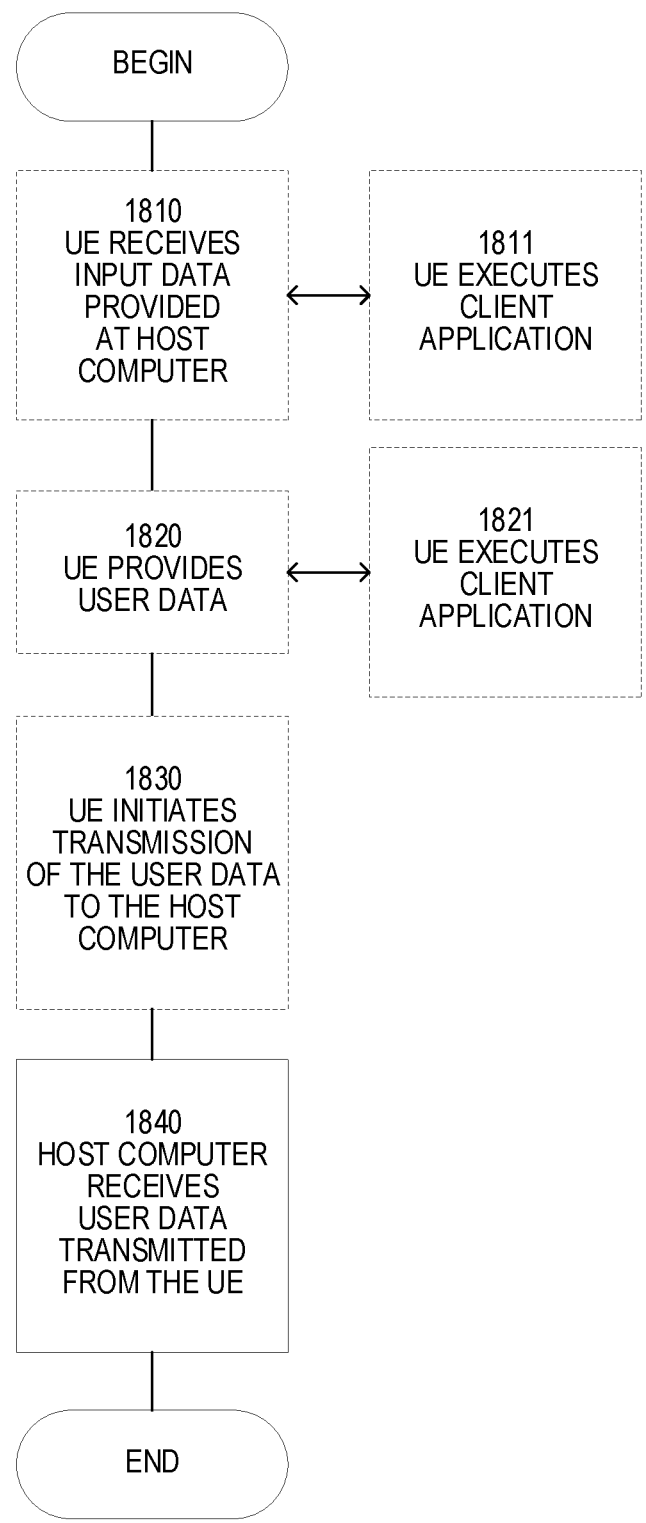

FIG. 18 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
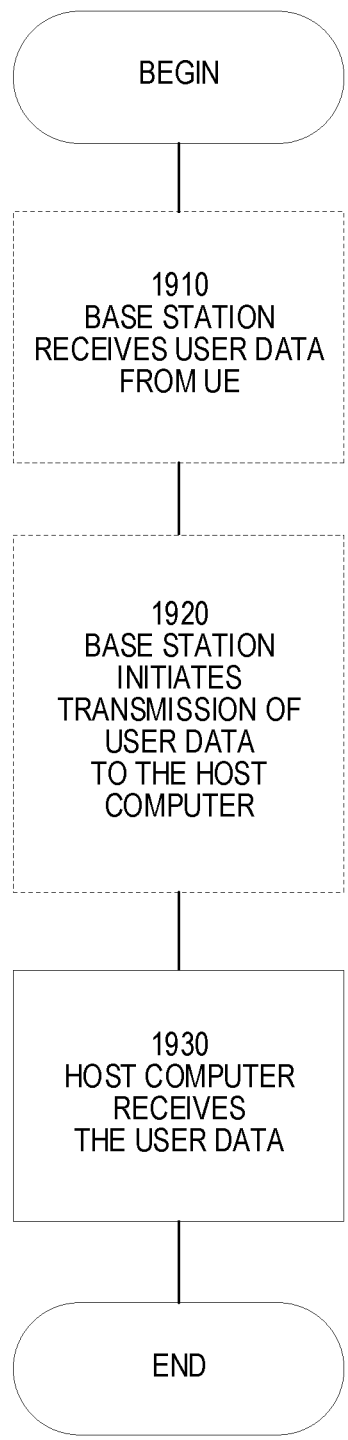

FIG. 19 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. The disclosed subject matter should not be construed as limited to only the embodiments set forth herein; rather, these embodiments are provided by way of example to convey the scope of the subject matter to those skilled in the art.

What is claimed is:

1. A method, implemented by a User Equipment (UE), the method comprising:
    determining paging occasions that are associated with a Narrowband Reference Signal (NRS) from a plurality of paging occasions based on a common timing reference between a Radio Access Network (RAN) node and the UE; and
    monitoring consecutive subframes for the NRS based on a first value indicating how many of the consecutive subframes preceding the paging occasions associated with the NRS to monitor.

2. The method of claim 1, further comprising selectively monitoring for the NRS in sets of consecutive subframes, each set of consecutive subframes corresponding to a respective paging occasion.

3. The method of claim 2, further comprising receiving a changed first value for each set of consecutive subframes to identify the consecutive subframes in the set.

4. The method of claim 2, wherein determining the paging occasions associated with the NRS from the plurality of paging occasions is further based on a pattern that indicates which of the plurality of paging occasions are associated with the NRS.

5. The method of claim 4, wherein determining the paging occasions associated with the NRS from the plurality of paging occasions based on the pattern is responsive to receiving a System Information Block indicating that the paging occasions associated with the NRS are not sparse compared to a threshold.

6. The method of claim 4, wherein for each of the sets of consecutive subframes, the first value is an integer between one and four.

7. The method of claim 2, further comprising receiving a System Information Block indicating that the paging occasions associated with the NRS are sparse compared to a threshold, and in response, determining the paging occasions as being associated with transmissions of the NRS.

8. The method of claim 7, wherein for each of the sets of consecutive subframes, the number of consecutive subframes is ten.

9. A method, implemented by a Radio Access Network (RAN) node, the method comprising transmitting, to a User Equipment (UE), a Narrowband Reference Signal (NRS) on paging occasions based on a common timing reference between the RAN node and the UE.

10. The method of claim 9, further comprising transmitting, to the UE, a first value indicating how many consecutive subframes preceding the paging occasions to monitor for the NRS.

11. The method of claim 10, further comprising transmitting the NRS in sets of consecutive subframes, each set of consecutive subframes corresponding to a respective paging occasion.

12. The method of claim 11, further comprising transmitting a changed first value for each set of consecutive subframes for the UE to use in identifying the consecutive subframes in the set in which to monitor for the NRS.

13. The method of claim 11, wherein transmitting the NRS in sets of consecutive subframes comprises transmitting the NRS in accordance with a pattern identifying the paging occasions from a plurality of paging occasions as being associated with the NRS.

14. The method of claim 13, further comprising transmitting a System Information Block indicating that the paging occasions are not sparse in time compared to a threshold, and transmitting the NRS in accordance with the pattern in response.

15. The method of claim 13, wherein for each of the sets of consecutive subframes, the first value is an integer between one and four.

16. The method of claim 11, further comprising transmitting a System Information Block indicating that the paging occasions are sparse in time relative to a threshold, wherein the paging occasions are consecutive paging occasions.

17. The method of claim 16, wherein for each of the sets of consecutive subframes, the number of consecutive subframes is ten.

18. A User Equipment (UE) comprising:
processing circuitry and a memory, the memory containing instructions executable by the processing circuitry whereby the UE is configured to:
determine paging occasions that are associated with a Narrowband Reference Signal (NRS) from a plurality of paging occasions based on a common timing reference between a Radio Access Network (RAN) node and the UE; and
monitor consecutive subframes for the NRS based on a first value indicating how many of the consecutive subframes preceding the paging occasions associated with the NRS to monitor.

19. A Radio Access Network (RAN) node comprising:
processing circuitry and a memory, the memory containing instructions executable by the processing circuitry whereby the RAN node is configured to:
transmit, to a User Equipment (UE), a Narrowband Reference Signal (NRS) on paging occasions based on a common timing reference between the RAN node and the UE.

* * * * *